Patented Mar. 15, 1932

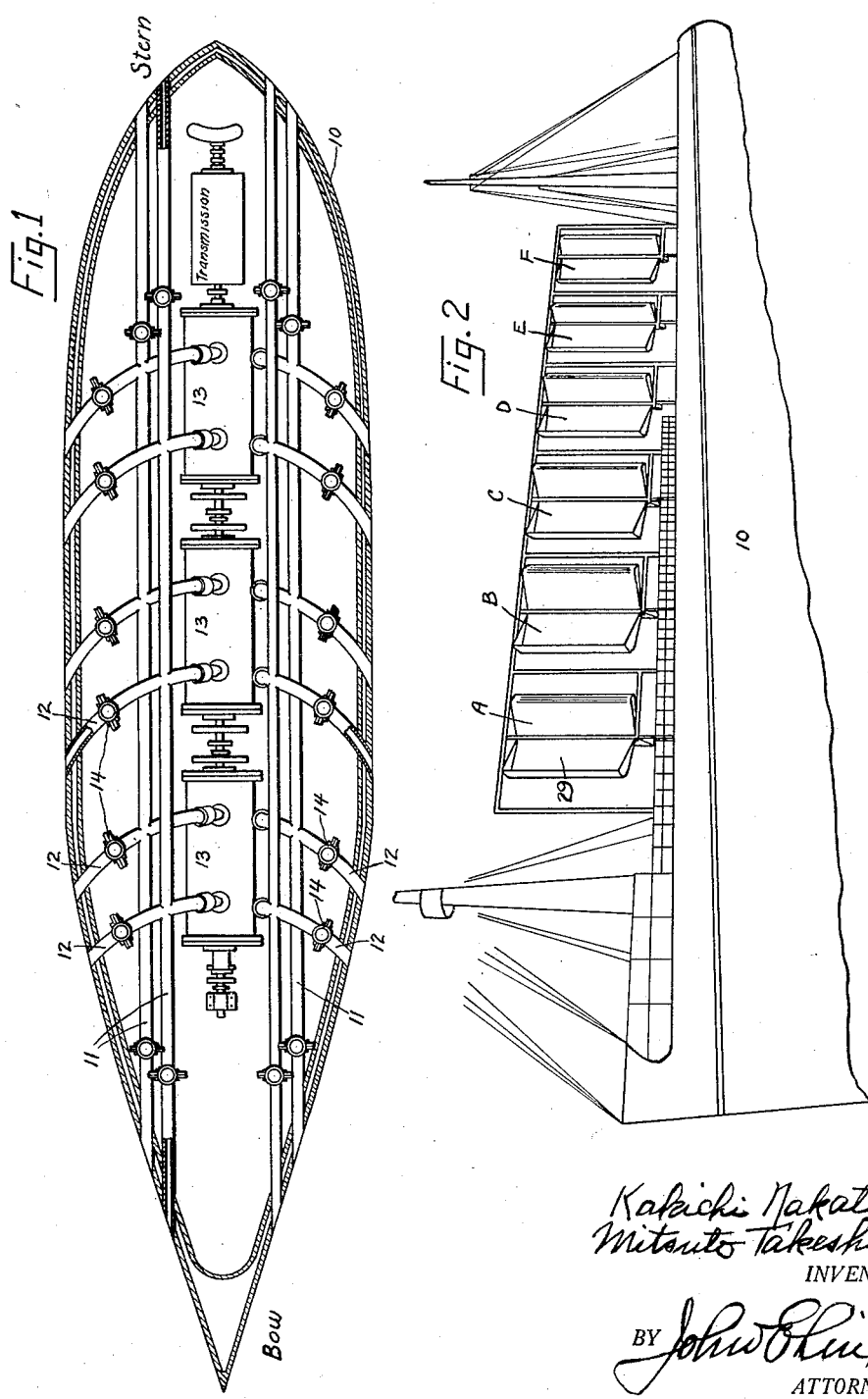

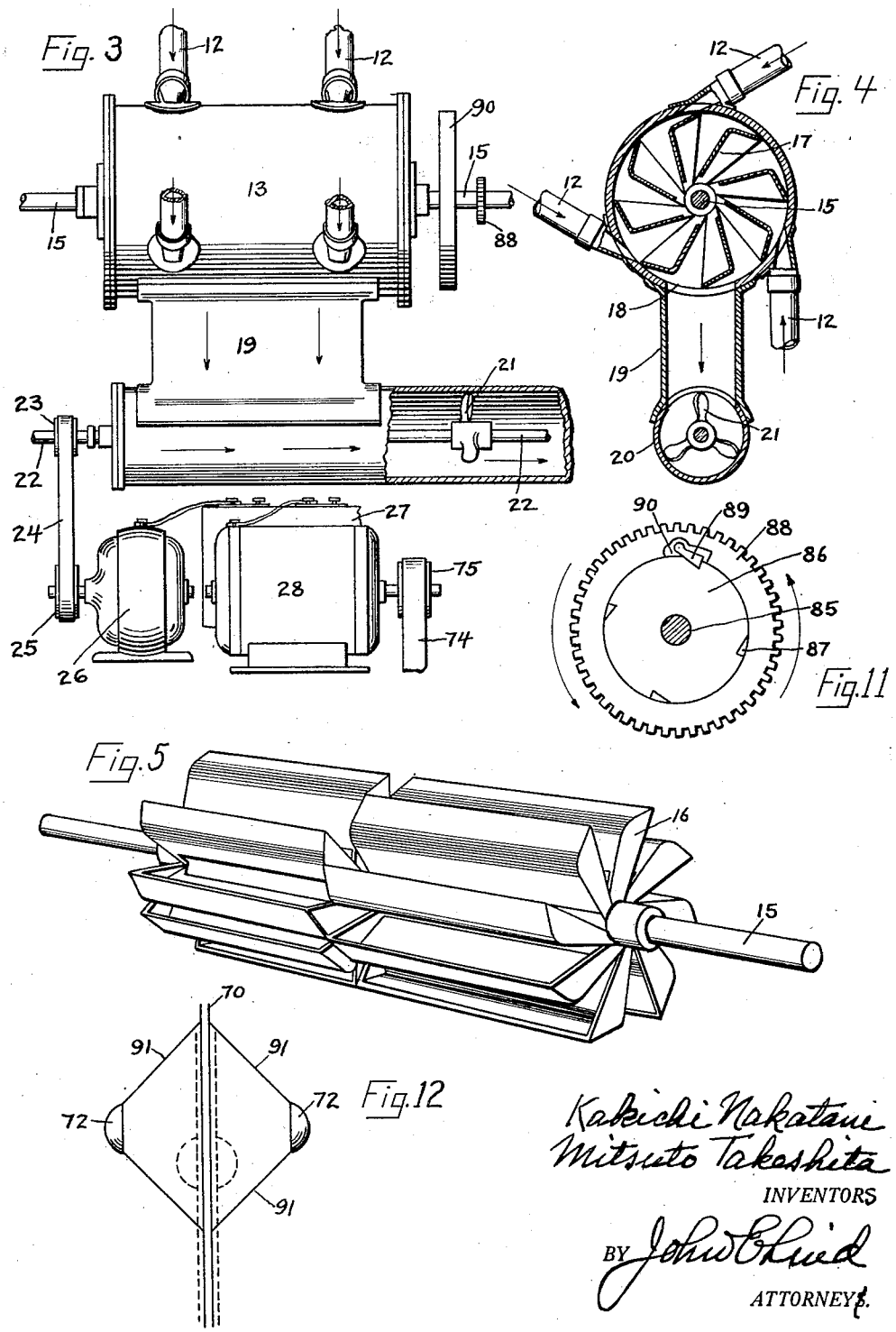

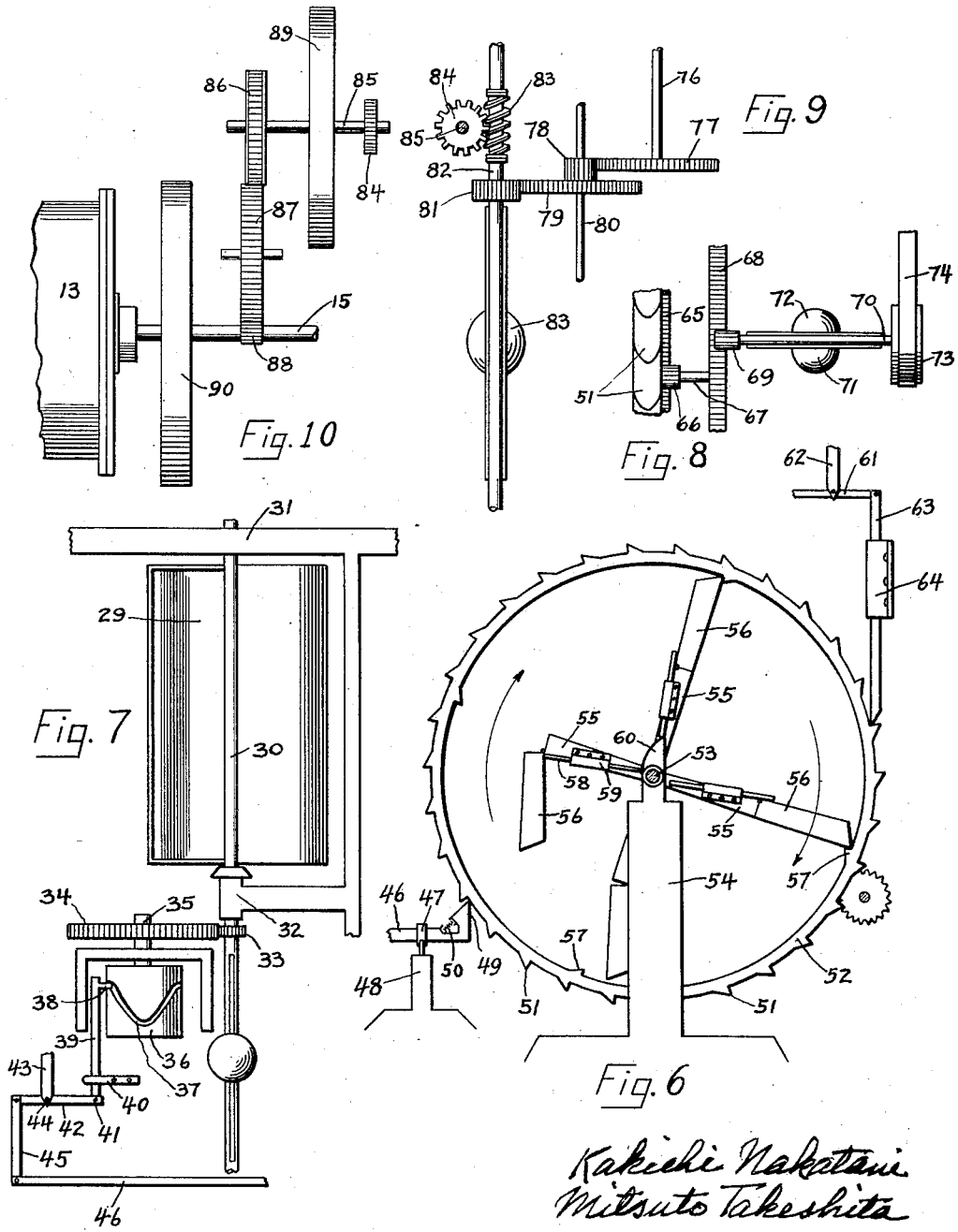

1,849,731

UNITED STATES PATENT OFFICE

KAKICHI NAKATANI AND MITSUTO TAKESHITA, OF LOS ANGELES, CALIFORNIA

SHIP PROPULSION

Application filed September 12, 1931. Serial No. 562,556.

This invention relates to a new and improved means for propelling a ship depending upon utilizing wind currents.

An object of the invention is to provide a system of mechanism which will utilize to the fullest extent intermittent currents of air.

A further object of the invention is to make use throughout the system of a series of energy conserving devices which will have the effect of preventing abrupt shocks of the various elements of the system.

A further object of the invention is to utilize a series of wind vanes, certain of which are connected to a generator battery system, while others are connected directly to the main shaft of the propelling system.

A further object of the invention is to utilize the inflow of water from the sides of the ship through pipes for driving a turbine which in turn drives the main shaft of the system.

With these and other objects in view as will hereinafter appear, our invention consists in the construction, arrangement and combination of the various parts of our device whereby the objects contemplated are secured as hereinafter more fully set forth, pointed out in our claims and illustrated in the accompanying drawings, in which Figure 1 shows a plan view of the water power apparatus, Figure 2 shows a side view of a boat illustrating the position of the wind vanes upon the deck, Figure 3 is a side elevational view with parts in cross section of the turbine and means for expelling water therefrom, Figure 4 is a cross sectional view of Figure 3 through the turbine chamber and the outflow chamber, Figure 5 is a perspective view of the turbine wheel, Figure 6 is a side elevational view of a stabilizing system located between the wind vanes and the generator, Figure 7 is an elevational view of a wind vane together with the connections between the same and the stabilizer shown in Figure 6, Figure 8 is a partial elevational view in detail, Figure 9 is a partial elevational view of the gearing connecting certain of the wind vanes to the main driving shaft, Figure 10 shows further gearing for connecting certain wind vanes directly to the main driving shaft, Figure 11 is a side view of a slip gear connection provided between the wind vanes and the main shaft, and Figure 12 is an elevational diagrammatical view of a detail used in conserving the energy developed in the system.

Referring to the drawings wherein similar reference characters indicate like parts throughout the various views, 10 illustrates the hull of a ship having the stern and bow disposed as indicated. Extending parallel to the longitudinal axis of the ship are a series of pipes 11 for conducting water to the water turbines 13 to be hereinafter more fully described. In addition, a series of pipes 12 extend from the sides of the ship also for leading water to the water turbines 13. The valves 14 are provided at the necessary places for controlling the amount of water allowed to enter the turbines 13. It is obvious that with a flow of water entering the turbines and the passage of such water therethrough, the main shaft 15 will be rotated.

A single water turbine will now be described, although it is understood that the same description applies to all the other turbines provided. Referring to Figures 3, 4 and 5, 15 indicates the main shaft of the propelling system. Fixedly mounted upon the shaft 15 is a water turbine 16 preferably of the shape indicated in Figure 5. The water wheel 16 is provided with surfaces 17 and the incoming water through the pipes 12 contacts the surfaces 17 and will thereby rotate the shaft 15. An opening 18 is provided in the bottom of the turbine chambers 13 and a discharge tunnel 19 surrounds the opening 18 and leads the discharged water to the tubular cylinder 20 in which rotates propellers 21 fixedly mounted upon the shaft 22 for discharging the water in the direction of the arrows shown in Figure 3.

The shaft 22 has mounted thereon a pulley 23 which is driven by means of the belt 24 from the pulley 25 provided upon the motor 26 which is driven by means of the batteries 27 and the batteries 27 are in turn supplied with electricity by means of the generator 28.

The means for driving the generator 28 will now be described. This mechanism is shown particularly in Figures 6, 7 and 8. In Figure 7 a wind vane 29 is shown fixed to the shaft 30 which is pivotally mounted upon the deck of the boat in any desired manner. The wind vanes are preferably of the type shown in Figure 2 in which a plurality of vanes are used. In the present case six wind vanes are shown, lettered A, B, C, D, E and F. The wind vanes A and B are utilized for driving the generator 28. The shaft 30 is pivotally mounted in the frame members 31 and 32 in any desired manner, and the shaft 30 is prolonged downwardly and has attached thereto a gear 33 which meshes with gear 34 upon the shaft 35 mounted in any suitable supports. The shaft 35 carries the groove cam 36 having the groove 37 therein. Riding in the cam groove 37 is the follower 38 which can, if desired, have a roller thereon. The follower 38 is rigidly connected to the rod 39 guided in the guide 40 and pivotally connected at 41 to the rod 42 which is pivotally mounted upon the supporting member 43 at 44. The other end of the rod 42 is pivotally connected to the rod 45 and the rod 45 is pivotally connected at its lower end to the rod 46.

Referring to Figure 6, the rod 46 is pivoted at 47 upon the supporting member 48 and the rod 46 terminates in an engaging head 49 which is pivotally secured to the rod 46 and is resiliently urged by the spring 50 against the ratchet teeth 51 upon the stabilizing device 52. The stabilizing wheel 52 is pivotally mounted upon the shaft 53, which shaft is mounted upon the supports 54.

Fixedly secured to the shaft 53 is a weight system comprising four arms 55, which arms have pivotally secured to the outer extremities thereof substantially heavy pivot weights 56 which are designed to be moved from the substantially right angular position shown upon the arm extending to the left in Figure 6 to the horizontal position shown in the arm extending to the right. The heavy weights 56 when extended are designed to cooperate with the stops 57 provided upon the stabilizer 52.

For moving the weights 56 there is provided rods 58 sliding in guides 59 and cooperating with the cam surface 60. The cam surface 60 will consecutively extend the weights 56 into alignment with the arms 55 and then gravity will return the weights 56 to the right angular position. This system provides an exceptionally heavy rotative mass which is designed to act as a stabilizer without imposing upon the system too much inertia due to the mass thereof.

A similar system cooperating with the stabilizer 52 extends from the wind vane B and utilizes a cam track similar to 36 and a system of levers terminating in a rod 61 which is pivoted to the support 62 and reciprocates rod 63 through the guide 64. The rod 63, due to its reciprocation, will cooperate with the ratchet teeth 51.

From Figure 8 it can be seen that the ratchet teeth 51 are provided adjacent thereto with a gear wheel 65. The gear wheel 65 meshes with gear 66 upon the shaft 67 supported in any desired manner. Fixed to shaft 67 is gear 68 which in turn meshes with gear 69 upon shaft 70 which carries a further stabilizing device 71. The stabilizing device 71 operates upon the principle of a governor and it will be noted that at low speed, due to the weight 72 of the stabilizer 71 being disposed closely adjacent to the shaft 70, that this lowers the amount of energy necessary to rotate the shaft 70, but that upon rotation of the shaft 70 the weight 72 will be carried by centrifugal force away from the shaft 70 and the stabilizer 71 will therefore tend to keep the system in operation after any short periods of force being applied to the system. In other words, the stabilizer 71 will store up kinetic energy to maintain the system in operation after any short gusts of air operating upon the wind vanes. The shaft 70 carries the pulley 73 about which runs the belt 74 which also extends about the pulley 75 fixed to the generator shaft.

The mechanism immediately above described sets forth the means whereby the generator 28 is set in motion so as to provide the electricity for the batteries 27. The two stabilizing systems 52 and 71 are essential in permitting a smooth operation of the various parts used.

The mechanism shown in Figures 9, 10 and 11 is designed to be connected to the vanes C, D, E and F directly to the main shaft 15 of the propelling system. The shaft 76 in Figure 9 extends from any one of the wind vanes indicated and is mounted in any suitable manner. The shaft 76 carries gear wheel 77 which meshes with gear 78, which is fixed to gear 79 upon the shaft 80, and gear 79 meshes with gear 81 which is secured to shaft 82 which carries the stabilizing device 83 which is similar to stabilizing device 71 previously described. A detailed description of this stabilizing device is therefore not deemed necessary.

The shaft 82 also carries worm gear 83′ which meshes with gear 84 fixed to shaft 85.

Referring to Figure 10 of the drawings, shaft 85 is fixed to a slip gear 86, to be further described below, and the slip gear 86 meshes with gear 87 which in turn meshes with gear 88 upon the main propelling shaft 15. The shaft 85 also has mounted thereon a fly-wheel 89, while shaft 15 also has mounted thereon a series of fly-wheels 90.

The construction of slip gear 86 will now be described. Referring to Figure 11 there is secured to shaft 85 a ratchet wheel 86 having the recesses 87 therein, and surrounding the ratchet wheel 86 is the spur gear 88 which carries a series of gravity actuated pawls 89. The pawls 89 are pivoted in recesses 90 provided in spur gear 88. It will be noted that if the wind vane is rotating the gear system just described more rapidly than the drive shaft 15 is being rotated by the water turbine, that in such case the ratchet wheel 86 will cooperate with the pawl 89 and add its energy to the rotational force applied to shaft 15. If however, the wind vane is not rotating the various shafts and gearing described more rapidly than the water power is rotating the shaft 15, then in such case the spur gear 88 can slip over the ratchet gear 86.

In Figure 12 a diagrammatical view of the stabilizer 71 is shown carrying the weights 72 upon the flexible members 91 which are secured in any desired way to the rotating shaft 70.

The operation of the system is believed to be perfectly clear from the previous description. Air power is utilized for rotating the generator 28 in order to store up power in the batteries 27 which in turn supply the power for rotating the motor 26 which rotates shaft 22 carrying the propellers 21. This forces and expels the water away from the water turbines 31 so as to create a flow of water for driving the water turbines. Certain of the wind vanes are connected directly to the shaft 15 by means of a slip gear as above described. These wind vanes will act directly upon the main shaft 15 and supplement the water power.

The stabilizers 52, 71, 83 and the fly-wheels 89 and 90 are all essential for the operation of the device. These various stabilizers are utilized to prevent shocks to the entire system due to short gusts of wind or to variations in the wind power which is always taking place. In such case the stabilizer 52 as well as the others mentioned come into play and keep the entire system working at a uniform rate.

The main shaft 15 is also designed to be connected with a dynamo which in turn will generate the electricity for driving a motor which will rotate the propeller.

It is of course obvious that the above description merely sets forth a preferred embodiment of the invention and that various modifications thereof may be made and all such modifications are intended to be included within the scope of the following claims.

I claim:

1. A ship propulsion device comprising wind power means, a water turbine, means for leading water to said turbine, means operated by said wind power means to force the water from said turbine, a shaft driven by said turbine, means connecting said wind power means directly to said shaft to increase the rotation thereof, stabilizing means connected to said shaft and means operated by said shaft for propelling the ship.

2. A ship propulsion device comprising pivoted vanes located upon the deck of a ship, a shaft upon which said vanes are mounted, a stabilizing device upon said shaft, a gear carried by said shaft, a second shaft having a gear meshing with said first mentioned gear, a cam carried by said second shaft, a system of pivoted rods oscillated by said cam, a weighted stabilizer rotated by said system of pivoted rods, a power plant, gearing connecting said second stabilizer to said power plant and means operated by said power plant for expelling water from a water turbine.

3. A ship propulsion device comprising a system of pipes allowing water to enter from the exterior of a ship, valves controlling said pipes, nozzles upon said pipes, a casing to which said nozzles are connected in spaced relation about the periphery thereof, a water wheel rotatably mounted in said casing adapted to be driven by the water from said nozzles, a shaft upon said water wheel connected to the propeller of the ship, a second propeller for discharging the water from said casing, means including wind vanes for rotating said second propeller and stabilizing devices upon the shaft of said water wheel.

4. A ship propulsion device comprising a water turbine, wind vanes located upon the deck of a ship, a shaft rotated by said wind vanes, gearing connecting said shaft to the shaft of said turbine, a slip gear interposed in said gearing and positioned upon the main shaft of the turbine so as to cut out the inertia of said wind vanes and connections when said turbine shaft is rotating faster than said wind vanes.

5. A ship propulsion device comprising a water turbine, wind vanes located upon the deck of a ship, a shaft rotated by said wind vanes, gearing connecting said shaft to the shaft of said turbine, a slip gear interposed in said gearing and positioned upon the main shaft of the turbine so as to cut out the inertia of said wind vanes and connections when said turbine shaft is rotating faster than said wind vanes, stabilizing devices also included in the connections between said wind vanes and said turbine shaft.

6. A power system for ships comprising a water turbine, means for allowing water to enter from the sides of the ship to said turbine for rotating the same, wind vanes, means connected to said wind vanes for additionally rotating the shaft of said turbine and means also connected to said wind vanes for discharging the water from said turbine.

7. A ship propulsion device comprising a water turbine, a power plant for expelling water from said turbine, a series of wind vanes located upon the deck of a ship in connection with said power plant, a propeller shaft positioned within said turbine, and a second series of wind vanes for rotating said propeller shaft.

8. A ship propulsion device comprising a water turbine, a series of pipes allowing water to enter from the exterior of a ship into said turbine, valves controlling said pipes, a water wheel rotatably mounted in said turbine, a shaft upon said water wheel connected to the propeller of a ship, a power plant for expelling water from said turbine, a series of wind vanes located upon the deck of a ship in connection with said power plant, and a second series of wind vanes connected to said propeller shaft for rotating the same.

In testimony whereof we have signed our names to this specification.

KAKICHI NAKATANI.
MITSUTO TAKESHITA.